United States Patent
Blanc et al.

(10) Patent No.: US 7,461,584 B2
(45) Date of Patent: Dec. 9, 2008

(54) DEVICE FOR THE PRODUCTION OF A BEVERAGE, PROVIDED WITH A MEANS OF DETECTION

(75) Inventors: Jean-Pierre Blanc, Nice (FR); Christian Ferrier, Nice (FR)

(73) Assignee: Compagnie Mediterraneenne des Cafes S.A., Carros (FR)

( * ) Notice: Subject to any disclaimer, the term of this patent is extended or adjusted under 35 U.S.C. 154(b) by 0 days.

(21) Appl. No.: 11/659,736

(22) PCT Filed: Jul. 26, 2005

(86) PCT No.: PCT/EP2005/053645
§ 371 (c)(1),
(2), (4) Date: Apr. 11, 2007

(87) PCT Pub. No.: WO2006/032564
PCT Pub. Date: Mar. 30, 2006

(65) Prior Publication Data
US 2007/0245901 A1    Oct. 25, 2007

(30) Foreign Application Priority Data
Aug. 10, 2004  (FR) .................................. 04 51829

(51) Int. Cl.
*A47J 31/00* (2006.01)
(52) U.S. Cl. .......................... 99/280; 99/285; 99/289 R; 99/295

(58) Field of Classification Search ........... 99/279–323, 99/495, 467, 275–277
See application file for complete search history.

(56) References Cited

U.S. PATENT DOCUMENTS

| | | | |
|---|---|---|---|
| 5,798,037 A | 8/1998 | Peacock | |
| 5,935,424 A * | 8/1999 | Dyer et al. | 210/85 |
| 6,429,889 B1 * | 8/2002 | Murokh | 347/224 |
| 6,505,544 B1 | 1/2003 | Blanc et al. | |
| 6,557,458 B1 | 5/2003 | Blanc et al. | |
| 6,994,015 B2 * | 2/2006 | Bruinsma | 99/289 R |
| 7,216,582 B2 * | 5/2007 | Yoakim et al. | 99/295 |

FOREIGN PATENT DOCUMENTS
WO          02/28241         4/2002

* cited by examiner

*Primary Examiner*—Timothy F. Simone
(74) *Attorney, Agent, or Firm*—Young & Thompson

(57) ABSTRACT

A device for the production of beverages by infusing a substance that is to be infused and which is contained in disposable packaging, includes: an infusion chamber having a configuration which can vary between an open position and a closed position for the infusion; elements for guiding the packaging from an introduction area (7) towards the infusion chamber, the guiding elements including a slide (6) which can cooperate with the periphery of the packaging, characterized by the fact that the inventive device includes elements (9) for detecting an identification marking on the packaging, the detection elements (9) being formed in the slide (6). The device is applicable to coffee machines using packaging provided with marking for identification purposes.

11 Claims, 3 Drawing Sheets

Fig. 3
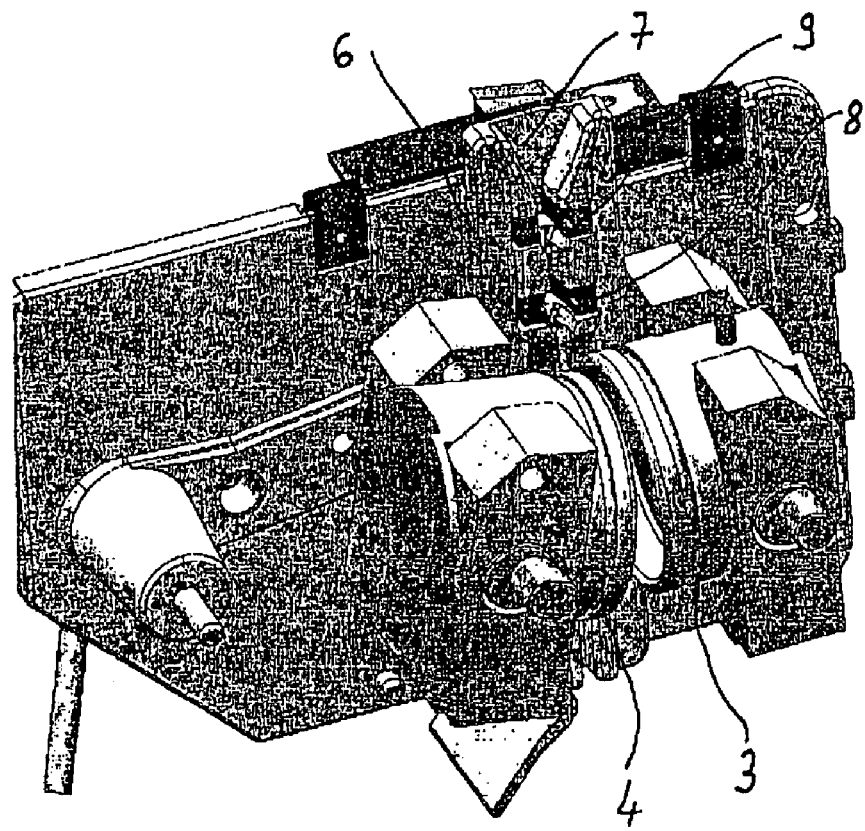
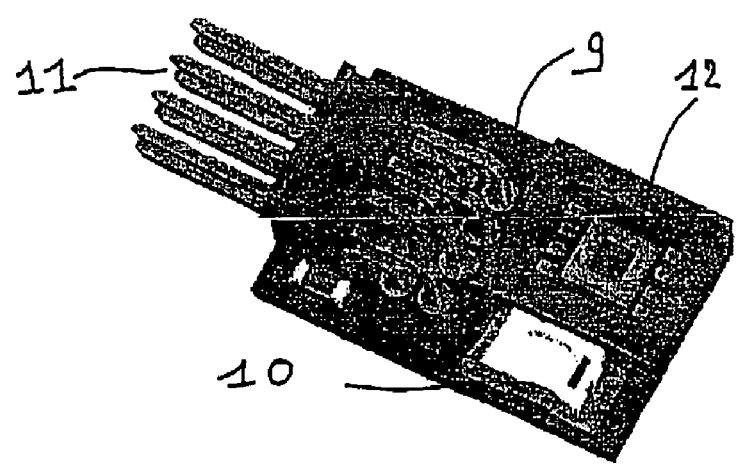
Fig. 4

DEVICE FOR THE PRODUCTION OF A BEVERAGE, PROVIDED WITH A MEANS OF DETECTION

CROSS-REFERENCE TO RELATED APPLICATIONS

The present invention relates to a device for the production of beverages by infusion of a substance which is contained in a disposable packaging.

It will be used in particular in the field of manufactured coffee machines which use packaging containing ground coffee.

The invention is in particular intended for use in machines which use packaging, filter paper-based of the type described in document WO-A-94/01039.

That said, this application is not restrictive and the invention could be used with other types of disposable packaging such as rigid permeable or impermeable capsules.

Document WO-A-98/02871 describes a coffee machine which uses individual packaging of ground coffee that can be inserted vertically by guiding means oriented roughly vertically and able to guide the packaging so that it slides into the infusion chamber.

This chamber generally consists of two parts that are able to be placed in a closed position for the infusion phase that involves passing water through the packaging and in an open position to allow the packaging to be introduced and rejected from the chamber.

Packaging of ground coffee with an identification code so that it can be identified during use is known.

Document WO-A-02/28241 describes such a packaging with several alternative markings. This may take the form of a given specific contour on the packaging, a predetermined colour, or the presence of a bar code.

The purpose of the marking is to generally ensure that the operation of the machine is selective by only allowing the use of certain categories of packaging.

The identification can also be used to adapt the operating parameters of the infusion device to suit the type of substance to be infused, in particular depending on the quantities of ground coffee.

Even though the detection principle of a marking on disposable packaging opens up many new opportunities for the use of infusion devices, there is a need to improve reading of the marking on the packaging.

STATEMENT REGARDING FEDERALLY SPONSORED RESEARCH OR DEVELOPMENT

No Applicable

INCORPORATION-BY-REFERENCE OF MATERIAL

Not Applicable

BACKGROUND OF THE INVENTION

This is the background to the present invention which proposes a new design for the infusion device with means for detecting an identification marking on the packaging which is executed and positioned in a specific manner relative to the remainder of the device.

In particular, according to the invention, the detection means are executed in a slide which is used to guide the packaging.

In this way, the correct positioning of the packaging relative to the detection means is guaranteed (reliability of the positioning of the packaging relative to the detection means, reduced and easily determined distance between the detection means and the packaging zone to be identified, etc.).

The present invention also has the advantage of ensuring perfect integration of the detection means in the remainder of the machine without creating additional protuberances which could make the design of the machine more complicated and hamper the introduction and the guiding of the disposable packagings.

In a preferred and advantageous manner, the invention ensures practical assembly and accurate positioning of the protection means on the machine.

Moreover, the detection means can be dismounted, particularly on failures.

Other aims and advantages will appear during the following description of a preferred embodiment of the invention which is not restrictive.

The present invention relates to a device for the production of beverages by infusion of a substance contained in a disposable packaging comprising:

an infusion chamber with a configuration that can be varied between an open position and a closed position for the infusion to take place.

means for guiding packaging from introduction zone towards infusion chamber, means which comprise a slide that co acts with the periphery of packaging, characterized in that it includes means for detecting identification markings on the packaging, the said detection means being formed in slide.

According to the preferred variants of the invention, this device is such that:

the detection means are means for recognizing at least one colour, the detection means include:
  a diode that is able to emit a light with a preset frequential spectrum towards the target zone on packaging,
  a detection component that is able to detect the light emitted or reflected by packaging and to interpret it in order to identify the marking on the packaging.

detection means comprising a support with a U shaped section forming part of the slide.

the support can be plugged into the body of slide, it includes a presence sensor formed on slide immediately upstream of the infusion chamber in order to detect any blocking of packaging.

the slide is tilted relative to the horizontal.

BRIEF DESCRIPTION OF SEVERAL VIEWS OF THE DRAWINGS

The attached drawings are given as examples of the invention and are not restrictive. They show only one embodiment of the invention and will enable it to be understood easily.

FIGS. 2 and 3 are perspective views of the invention device in an additional embodiment.

FIG. 4 is an example of a configuration of the detection means to be used.

DETAILED DESCRIPTION OF THE INVENTION

Figure 1:
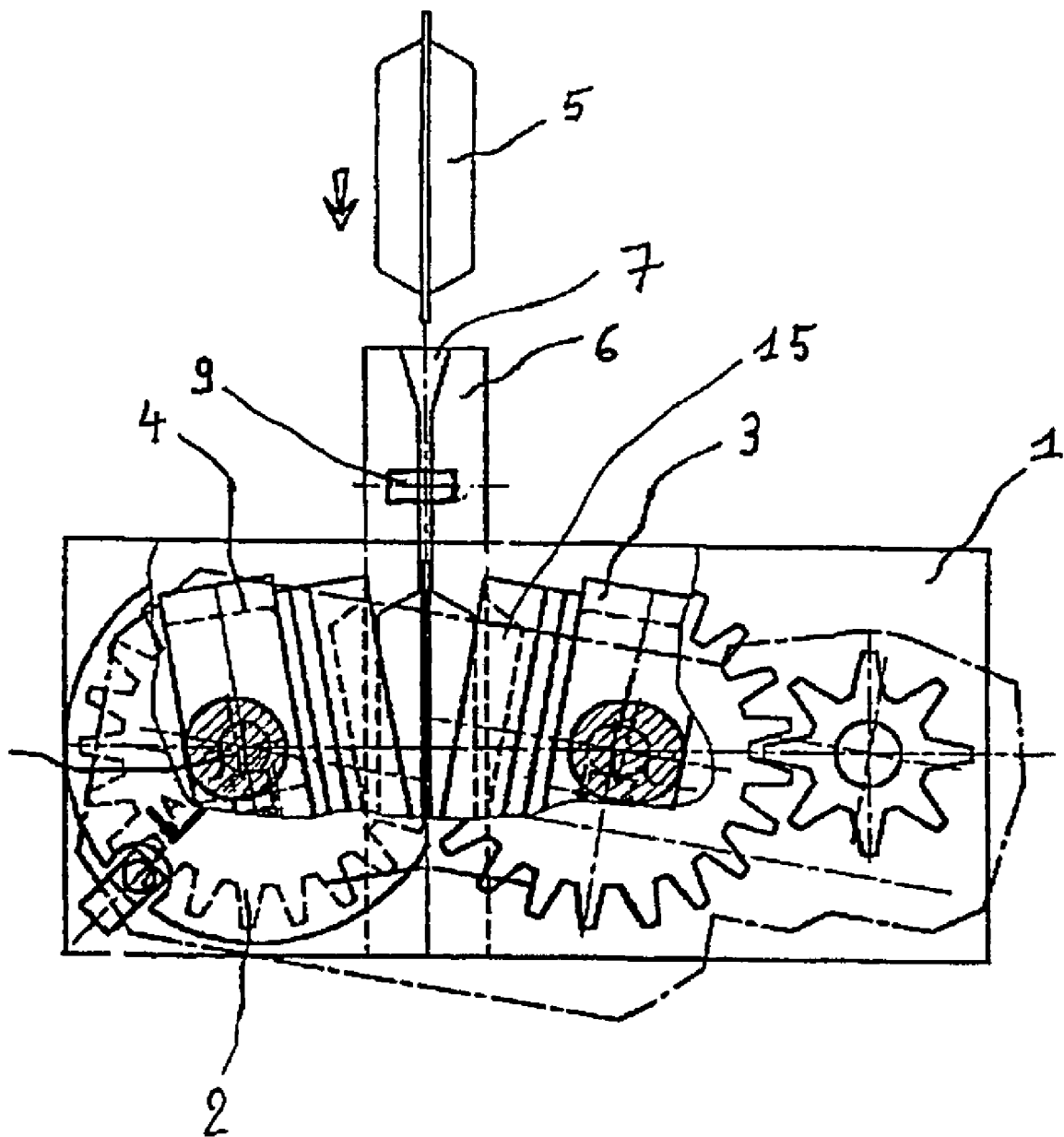
FIG. 1 is a diagrammatic side view of the invention device with a partial section in a first embodiment.

FIG. 1 shows the essential elements of the device for producing beverages by infusion showing mobile parts 3, 4 that may be modified in their configuration so as to create an infusion chamber 15 that opens or closes according to their position.

Such operation is describes in document WO-A-98/02871.

Of course, this is not restrictive and applies to any type of device with an infusion chamber that may be opened or closed depending on the phase in the operating sequence, for instance by translational and/or rotational movement.

In the case shown, disposable packaging 5, containing for instance ground coffee, can be introduced into the device at introduction zone 7.

This device has mobile parts 3, 4 which are fitted to oscillate and move closer or apart relative to a frame 1 so that on the one hand the infusion chamber is closed during the liquid flow phase and on the other the infusion chamber opens and orients upwards (as in FIG. 1) for introducing the packaging 5 or towards the bottom (FIGS. 2 and 3) in order to set in stop the new packaging over infusion chamber 15 and/or eject used packaging via the lower part of this device.

In a known manner, the device also includes a boiler 13 that is able to supply infusion chamber 15 when this is in a closed position in order to execute infusion.

A pump system is also generally provided in order to carry out force leaching.

Figure 2:
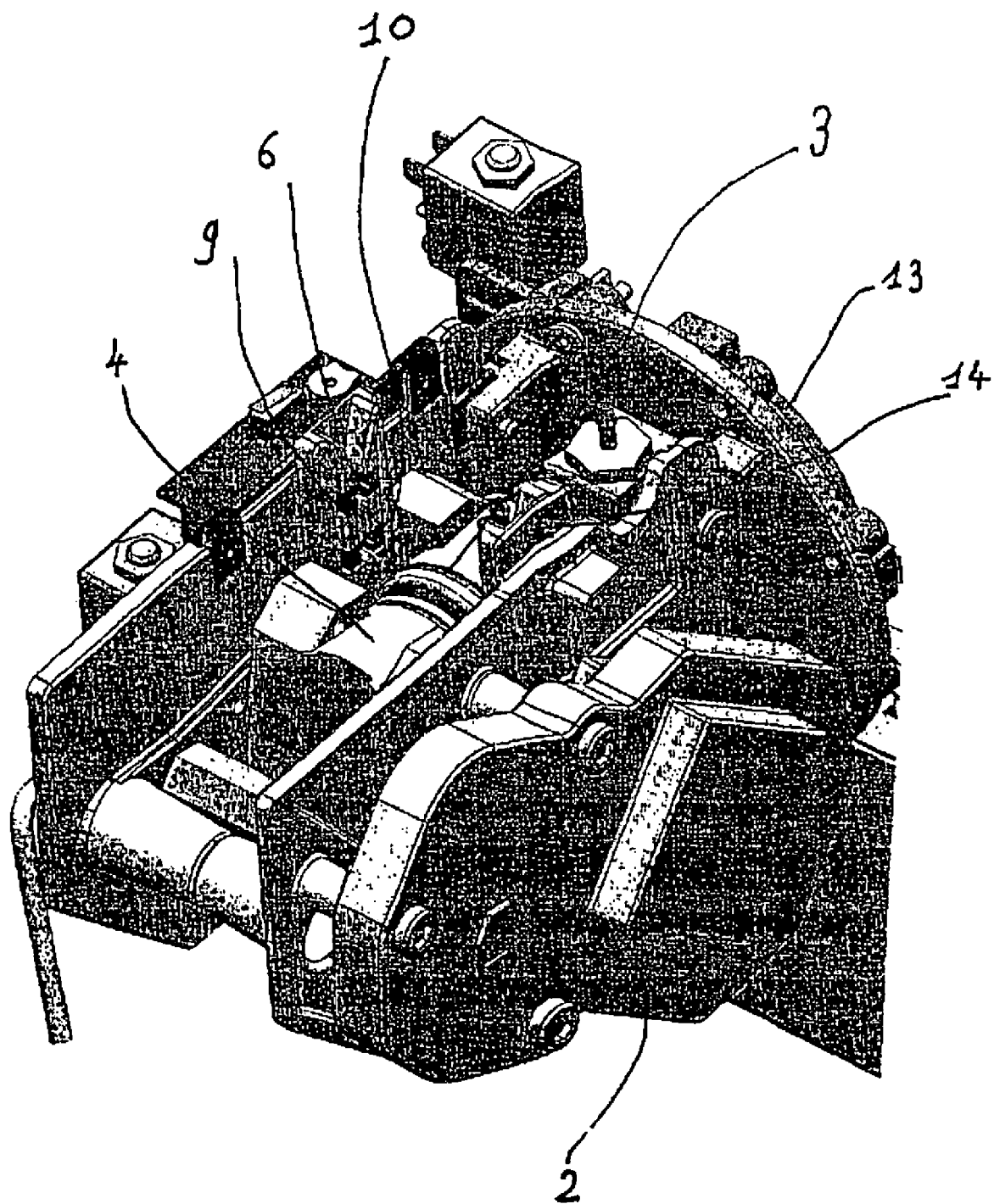

FIGS. 1 and 2 give, as an indication, an example of drive means 2 provided (here in the form of a toothed gears and a motor) allowing the transmission of power from the motor to moving parts 3, 4.

As indicated previously, this design is not restrictive.

As can be seen on FIGS. 1 to 3, the device also includes guiding means in the form of slide 6 and secondary slide 14 to allow packaging 5 to slide from introduction zone 7 to infusion chamber 15 and, eventually, after infusion chamber 15, towards an ejection zone.

In the present case, slide 6 and secondary slide 14 have a virtually identical external form and are positioned symmetrically relative to the infusion chamber, roughly on the contract plane of moving parts 3, 4 when in a closed position.

The long elements constitutive of slides 6, 14 have a longitudinal groove that is able to co act with part of the periphery of the disposable packaging of appropriate width in order to make a sliding adjustment so as to form the guiding means.

Packaging 5 is an example that can be used with the invention device, but is not restrictive.

Indeed, it may consist of a capsule which is roughly in the form of a small rigid receptacle with an edge which is able to co act with slide 6.

Packaging 5 includes marking on the periphery that is able to co act with slide 6 so that the invention device detects the type of marking.

Below is described a preferred embodiment in which the marking is of a predetermined colour.

By colour is meant a shade of colour that can be individualized by detection means.

The invention device may recognize one or more colours according to the device operating method.

In a characteristic manner, slide 6 includes detection means 9, an example of which is shown in a front view in FIG. 1.

FIGS. 2 and 3 give another example in perspective.

In the case shown, detection means 9 include a general support in rigid plastic and showing a U shaped section.

At the rear of the U shaped section is a connector arranged to execute the means for electrical connection of detection means 9.

This advantageous configuration ensures that detection means 9 form a part of slide 6.

The detection means 9 are positioned very reliably relative to the periphery of packaging 5 on which the detection is to take place and is thus highly reliable Moreover, as shown on FIGS. 2 and 3, detection means 9 are easy to plug in or dismount relative to the remainder of slide 6.

FIG. 4 shows another embodiment of detection means 9 in the form of a roughly flat support.

This support receives an LED type diode 10 able to emit a light on a predetermined frequency spectrum (for instance white light) in the direction of a target zone on the periphery of packaging 5 co acting with slide 6.

Diode 10 emits such a light in the direction of packaging 5 which, if it is opaque, reflects part of this light, the reflected light being variable depending on the colour of the reflection surface of packaging 5.

The light thus reflected is dispatched to a detection component 12 with several cells photosensitive to part of the light spectrum.

Selective excitation of the cells ensures the formation of an electrical signal in the form of voltage which is representative of the light in question.

Detection component 12 also includes, integrally or separately, means for interpreting this electrical voltage in order to determine the nuance of colour read on packaging 5.

For instance, detection component 12 includes a voltage/frequency converter which allows the transformation of the electrical detection signal into a frequency representative of a light with a predetermined frequential spectrum.

This frequential signal resulting from the conversion can be compared to preset standard signals stored in the component.

A comparison is then made in order to determine whether the frequential signal resulting from the detection is identical to one of the stored reference signal(s).

If the comparison is positive, detection component 12 then indicates that the colour of packaging 5 has been recognized.

Connections 11 allow the input and output of electrical signals from and towards detection means 9.

FIG. 4 shows the case of detection means 9 operating in a reflective manner, that is to say using the target surface on packaging 5 as a reflection surface in order to measure the reflected light.

However, detection means 9 can also be used to operate in a transmitive manner, that is to say to detect the light transmitted through the target zone of packaging 5.

In this context, the target zone of packaging 5 will be of a predetermined colour and non opaque so as to allow partial transmission of the light through its thickness.

In this case, diode 10 and detection component 12 are positioned opposite relative to slide 6.

In a further advantageous manner, the invention device incorporates a presence sensor 8 in the case shown between detection means 9 and infusion chamber 15, as in the embodiment on FIGS. 2 and 3.

More precisely, presence sensor 8 is positioned immediately upstream of the infusion chamber 15 relative to the direction of introducing packaging 5.

This presence sensor 8 is used to ensure that packaging 5 is not blocked at this level.

In particular, an infusion phase cannot be started if presence sensor 8 has detected that a packaging 5 is present at this level.

Below is described more precisely a method for operating the invention device.

The user introduces packaging 5 at introduction zone 7 which is generally slightly flared to facilitate introduction.

Packaging 5 then slides into the guiding means formed in slide 6 of secondary slide 14.

By creating slides 6 and 14 in a manner sufficiently tilted relative to the horizontal, gravity causes packaging 5 to descend naturally.

By doing this, packaging 5 reaches the stop on the upper face of mobile parts 3 and 4 and this by preserving a zone on its edge with respect to detection means 9.

These means then ensure that the marking present on packaging 5 can be read.

If this marking is recognized by detection means 9, infusion chamber 15 opens to allow packaging 5 to enter, then closes for infusion to take place and finally, ejection of packaging 5 by opening the bottom of aforesaid chamber 15.

If the marking on packaging 5 is not recognized by detection means 9, a vocal or visual message may appear for use by the user in order to indicate to him that the type of packaging introduced cannot be used with the device.

When this detection takes place, it is also possible to actuate mobile parts 3 and 4 in order to eject packaging 5 directly without the infusion taking place.

As indicated previously, detection means 9 can also allow several colours to be recognized so that the infusion parameters can be adapted to the type of packaging 5.

This can be used to increase the temperature of the infusion water, increase or decrease the pressure or the duration of infusion, and the volume of water injected.

REFERENCES

1. Frame
2. Drive means
3. Mobile part
4. Mobile part
5. Packaging
6. Slide
7. Introduction zone
8. Presence sensor
9. Detection means
10. Diode
11. Connections
12. Detection component
13. Boiler
14. Secondary slide
15. Infusion chamber

The invention claimed is:

1. Device for producing beverages by infusing a substance enclosed in a disposable packaging comprising:
    a chamber in which infusion takes place and which varies between a closed infusing position and an open position,
    a slide for guiding the packaging from an introduction zone towards said infusion chamber, said slide being adapted to co-act with a periphery of the packaging and comprising a color detector for recognizing at least one identification color on the packaging wherein said color detector comprises:
    a diode which is able to emit light, with a preset frequency spectrum, towards a target zone on the packaging;
    a detection component able to detect the light emitted or reflected by the packaging and interpret it in order to recognize the identification color on the packaging.

2. Device according to claim 1 wherein said slide includes a support with a U shaped section forming part of the slide.

3. Device according to claim 2 wherein the support can be plugged into the body of said slide.

4. Device according to claim 1 further comprising a presence sensor formed on the slide immediately upstream of the infusion chamber, in order to detect any blocking of packaging.

5. Device according to claim 1, wherein said slide is tilted relative to the horizontal.

6. Device according to claim 2, further comprising a presence sensor formed on the slide immediately upstream of the infusion chamber, order to detect any blocking of packaging.

7. Device according to claim 3, further comprising a presence sensor formed on the slide immediately upstream of the infusion chamber, in order to detect any blocking of packaging.

8. Device according to claim 2, wherein the slide is tilted relative to the horizontal.

9. Device according to claim 3, wherein the slide is tilted relative to the horizontal.

10. Device according to claim 4, wherein the slide is tilted relative to the horizontal.

11. Device according to claim 1 further comprising a second slide positioned symmetrically to said slide, about the infusion chamber.

* * * * *